(12) United States Patent
Iyer et al.

(10) Patent No.: US 12,572,950 B2
(45) Date of Patent: Mar. 10, 2026

(54) METHODS FOR AUTHENTICATING AN ITEM

(71) Applicant: Avery Dennison Retail Information Services LLC, Mentor, OH (US)

(72) Inventors: Pradeep S. Iyer, Lakewood, OH (US); Ronald Wiegers, 's-Hertogenbosch (NL)

(73) Assignee: Avery Dennison Retail Information Services LLC, Mentor, OH (US)

( * ) Notice: Subject to any disclaimer, the term of this patent is extended or adjusted under 35 U.S.C. 154(b) by 202 days.

(21) Appl. No.: 17/759,414

(22) PCT Filed: Jan. 27, 2021

(86) PCT No.: PCT/US2021/015176
§ 371 (c)(1),
(2) Date: Jul. 25, 2022

(87) PCT Pub. No.: WO2021/154777
PCT Pub. Date: Aug. 5, 2021

(65) Prior Publication Data
US 2023/0058883 A1     Feb. 23, 2023

Related U.S. Application Data

(60) Provisional application No. 62/966,147, filed on Jan. 27, 2020.

(51) Int. Cl.
| | |
|---|---|
| *G06F 21/00* | (2013.01) |
| *G06Q 30/018* | (2023.01) |
| *G06V 20/80* | (2022.01) |
| *H04L 9/32* | (2006.01) |

(52) U.S. Cl.
CPC ......... *G06Q 30/0185* (2013.01); *G06V 20/80* (2022.01); *H04L 9/3239* (2013.01); *H04L 9/3278* (2013.01); *G06Q 2220/00* (2013.01); *H04L 9/3247* (2013.01)

(58) Field of Classification Search
CPC ........... G06Q 30/0185; G06Q 2220/00; G06V 20/80; H04L 9/3239; H04L 9/3278; H04L 9/3247; H04L 9/50
See application file for complete search history.

(56) References Cited

U.S. PATENT DOCUMENTS

| | | | |
|---|---|---|---|
| 5,845,257 | A | 12/1998 | Fu et al. |
| 5,974,150 | A | 10/1999 | Kaish et al. |
| 6,104,410 | A | 8/2000 | Wong |
| D450,711 | S | 11/2001 | Istvan et al. |
| D517,435 | S | 3/2006 | Yamada |
| 7,080,041 | B2 | 7/2006 | Nagel |
| 7,162,035 | B1 | 1/2007 | Durst et al. |
| 7,207,012 | B1 | 4/2007 | House et al. |
| D553,631 | S | 10/2007 | Blencowe |
| D574,390 | S | 8/2008 | Lee |
| 7,473,097 | B2 | 1/2009 | Raby et al. |
| 7,518,511 | B1 | 4/2009 | Panja et al. |
| 7,552,860 | B2 | 6/2009 | Tani et al. |
| D607,003 | S | 12/2009 | Bull et al. |
| D621,846 | S | 8/2010 | Rasmussen et al. |
| D636,779 | S | 4/2011 | Boush et al. |
| D646,689 | S | 10/2011 | Ulliot |
| 8,040,571 | B2 | 10/2011 | Yamamizu |
| 8,171,567 | B1 | 5/2012 | Fraser et al. |
| D674,403 | S | 1/2013 | Pearcy et al. |
| D681,654 | S | 5/2013 | Hirsch et al. |
| 8,447,987 | B1 * | 5/2013 | Polonsky .............. H04L 9/3247 |
| | | | 235/440 |
| D689,512 | S | 9/2013 | Pearcy et al. |
| D693,845 | S | 11/2013 | Pearcy et al. |
| D696,681 | S | 12/2013 | Kim et al. |
| 8,597,093 | B2 | 12/2013 | Engelberg |
| 8,947,374 | B2 | 2/2015 | Flam et al. |

(Continued)

FOREIGN PATENT DOCUMENTS

| | | |
|---|---|---|
| CN | 101136100 | 3/2008 |
| CN | 101681440 | 3/2010 |

(Continued)

OTHER PUBLICATIONS

Track shipments—Khatri, https://dribbble.com/shots/3922544-Track-Shipments, 2017.
Invoice user base shipment—Dovile, https://dribbble.com/shots/5385970-Invoice-user-base-shipments, 2018.
Shipment Detail View—Reindl, https://dribbble.com/shots/6929918-Shipment-Detail_View, 2019.
Redesign of the Admin Panel—Bykova, https://dribbble.com/shots/14621402-Redesign-of-the-Admin-Panel, 2020.
"Easy Auto Repair Shop Software," Apr. 20, 2017, posted at autorepairbill.com, site visted Sep. 14, 2023. https://web.archive.org/web/20170420052320/http://autorepairbill.com, 2017.

(Continued)

*Primary Examiner* — Michael M Lee

(57) ABSTRACT

Methods and systems including one or more entropically configured distinct physical features (an "identropy") that serve as unique identifiers for a physical item, such as a product or device, particularly products and/or devices in commerce, documents, packaging, etc. are described herein. The identropy makes it possible to uniquely distinguish one item from the other. In one embodiment, the identropy needs to be converted into a digital entity which can be done through a challenge-response interaction, in which a physical challenge acts upon the identropy, and in which the identropy as a reaction to the challenge will provide a physical response. In some embodiments, the response(s) described above is encrypted. In some embodiments, the resulting decrypted and optionally decompressed code can be compared to the digital response that was retrieved upon the challenge by the authentication device to estimate a trust score, such as a trust quotient.

12 Claims, No Drawings

(56) References Cited

U.S. PATENT DOCUMENTS

| | | | |
|---|---|---|---|
| D744,507 S | 12/2015 | Fujioka | |
| D755,198 S | 5/2016 | Meyers et al. | |
| D755,828 S | 5/2016 | Kimura et al. | |
| D765,673 S | 9/2016 | Leabman | |
| D766,916 S | 9/2016 | Bertnick et al. | |
| D769,253 S | 10/2016 | Kim et al. | |
| D769,270 S | 10/2016 | Hazam et al. | |
| D776,152 S | 1/2017 | Park et al. | |
| D780,778 S | 3/2017 | Wiggins et al. | |
| 9,619,807 B2 | 4/2017 | Park et al. | |
| D790,586 S | 6/2017 | Gopalan et al. | |
| D795,275 S | 8/2017 | Koh et al. | |
| D802,004 S | 11/2017 | Zhao et al. | |
| 9,923,914 B2 | 3/2018 | Stiansen | |
| D817,983 S | 5/2018 | Raff et al. | |
| D820,294 S | 6/2018 | Lee et al. | |
| D821,409 S | 6/2018 | Chang et al. | |
| 9,996,996 B2 | 6/2018 | Siebels et al. | |
| 10,104,156 B2 | 10/2018 | Ito | |
| D838,738 S | 1/2019 | Howland et al. | |
| D839,303 S | 1/2019 | Jung et al. | |
| D852,224 S | 6/2019 | Qin et al. | |
| 10,327,583 B2 | 6/2019 | Hiatt et al. | |
| D854,039 S | 7/2019 | Kirsanov et al. | |
| D869,492 S | 12/2019 | Adler | |
| D871,431 S | 12/2019 | Cullum et al. | |
| D872,101 S | 1/2020 | Leck et al. | |
| D872,115 S | 1/2020 | Azzi et al. | |
| D872,743 S | 1/2020 | Knowles et al. | |
| D875,754 S | 2/2020 | Feng et al. | |
| D879,805 S | 3/2020 | Fatnani et al. | |
| D879,807 S | 3/2020 | Cleriere et al. | |
| D879,819 S | 3/2020 | Bhardwaj et al. | |
| D880,499 S | 4/2020 | Fatnani et al. | |
| D884,008 S | 5/2020 | Thornberg | |
| D890,190 S | 7/2020 | Vanduyn et al. | |
| D890,197 S | 7/2020 | Cornet et al. | |
| D891,470 S | 7/2020 | Shan et al. | |
| D898,054 S | 10/2020 | Everhart et al. | |
| D900,137 S | 10/2020 | Lopes et al. | |
| D900,140 S | 10/2020 | Park | |
| D916,760 S | 4/2021 | Hubbard et al. | |
| D916,875 S | 4/2021 | Elia et al. | |
| D918,245 S | 5/2021 | Getman et al. | |
| D927,548 S | 8/2021 | Starukhin et al. | |
| 11,210,495 B2 | 12/2021 | Sharma et al. | |
| D958,177 S | 7/2022 | Nuttbrown et al. | |
| D962,266 S | 8/2022 | Graves et al. | |
| D967,156 S | 10/2022 | Thornberg | |
| D972,577 S | 12/2022 | Hartman et al. | |
| 11,568,460 B2 | 1/2023 | Bandara et al. | |
| D983,818 S | 4/2023 | He et al. | |
| 2004/0098747 A1 | 5/2004 | Kay et al. | |
| 2005/0216841 A1 | 9/2005 | Acker et al. | |
| 2006/0200308 A1 | 9/2006 | Arutunian | |
| 2006/0208887 A1 | 9/2006 | Fields et al. | |
| 2006/0230276 A1 | 10/2006 | Nochta | |
| 2006/0265584 A1 | 11/2006 | Bourret et al. | |
| 2007/0113180 A1 | 5/2007 | Danninger | |
| 2007/0234058 A1* | 10/2007 | White | H04L 9/3247 |
| | | | 713/176 |
| 2007/0240133 A1 | 10/2007 | Neil et al. | |
| 2007/0245238 A1 | 10/2007 | Fugitt et al. | |
| 2008/0192992 A1 | 8/2008 | Moshe | |
| 2008/0252066 A1 | 10/2008 | Rapoport et al. | |
| 2009/0008924 A1 | 1/2009 | Ophey et al. | |
| 2009/0218401 A1 | 9/2009 | Moran et al. | |
| 2009/0307032 A1 | 12/2009 | Tribe et al. | |
| 2010/0017237 A1 | 1/2010 | Dalesandro et al. | |
| 2010/0017812 A1 | 1/2010 | Nigam | |
| 2010/0065646 A1 | 3/2010 | Couck et al. | |
| 2010/0211900 A1 | 8/2010 | Fujioka | |
| 2010/0250782 A1 | 9/2010 | Pratt et al. | |
| 2011/0137800 A1 | 6/2011 | Kerschbaum et al. | |
| 2011/0289458 A1 | 11/2011 | Dow | |

| | | | |
|---|---|---|---|
| 2012/0089920 A1 | 4/2012 | Eick | |
| 2012/0089933 A1 | 4/2012 | Garand et al. | |
| 2012/0243797 A1 | 9/2012 | Di Venuto Dayer et al. | |
| 2012/0298743 A1* | 11/2012 | Voloshynovskyy | G07D 7/005 |
| | | | 235/375 |
| 2012/0327450 A1* | 12/2012 | Sagan | G03G 21/046 |
| | | | 358/1.14 |
| 2013/0173484 A1* | 7/2013 | Wesby | G06K 7/1417 |
| | | | 705/318 |
| 2014/0033071 A1 | 1/2014 | Gruber et al. | |
| 2014/0175165 A1* | 6/2014 | Havens | G06Q 30/0185 |
| | | | 235/375 |
| 2014/0205153 A1 | 7/2014 | Sharma et al. | |
| 2014/0263636 A1 | 9/2014 | Jones et al. | |
| 2014/0279294 A1 | 9/2014 | Field-Darragh et al. | |
| 2014/0372335 A1 | 12/2014 | Jones et al. | |
| 2014/0379321 A1 | 12/2014 | Xu | |
| 2015/0134552 A1* | 5/2015 | Engels | G06Q 10/087 |
| | | | 705/318 |
| 2015/0151560 A1 | 6/2015 | Volohhonski et al. | |
| 2016/0104132 A1 | 4/2016 | Abbatiello et al. | |
| 2016/0117059 A1 | 4/2016 | Folken et al. | |
| 2016/0155200 A1 | 6/2016 | Basu et al. | |
| 2016/0377423 A1 | 12/2016 | Eilers et al. | |
| 2017/0032381 A1* | 2/2017 | Vaidyanathan | G06Q 30/0185 |
| 2017/0048216 A1 | 2/2017 | Chow et al. | |
| 2017/0116565 A1 | 4/2017 | Feiner | |
| 2017/0132892 A1 | 5/2017 | Vargas et al. | |
| 2017/0228742 A1 | 8/2017 | Aljawhari | |
| 2017/0243233 A1 | 8/2017 | Land et al. | |
| 2017/0262862 A1 | 9/2017 | Aljawhari | |
| 2018/0041983 A1 | 2/2018 | Mulaosmanovic et al. | |
| 2018/0253430 A1 | 9/2018 | Grigorescu et al. | |
| 2018/0284093 A1 | 10/2018 | Brown et al. | |
| 2019/0012637 A1 | 1/2019 | Gillen | |
| 2019/0050613 A1 | 2/2019 | Wilkinson et al. | |
| 2019/0213532 A1 | 7/2019 | Brightwell et al. | |
| 2019/0317935 A1 | 10/2019 | Berti et al. | |
| 2019/0334730 A1 | 10/2019 | Endress et al. | |
| 2019/0354922 A1 | 11/2019 | Berti et al. | |
| 2019/0392646 A1 | 12/2019 | Parfenov et al. | |
| 2020/0065826 A1* | 2/2020 | Gering | G06K 7/1094 |
| 2020/0082235 A1* | 3/2020 | Gupta | G09F 3/0297 |
| 2020/0143032 A1* | 5/2020 | Horstmeyer | G02B 21/06 |
| 2020/0242354 A1* | 7/2020 | Ligman | H04L 9/0637 |
| 2020/0265329 A1 | 8/2020 | Thomson et al. | |
| 2020/0295936 A1 | 9/2020 | Covaci et al. | |
| 2021/0081938 A1* | 3/2021 | Falk | H04L 9/3247 |
| 2021/0082022 A1 | 3/2021 | Whitman et al. | |
| 2021/0173945 A1* | 6/2021 | Karr | G06F 16/1748 |
| 2021/0272037 A1 | 9/2021 | Hanebeck | |
| 2021/0366568 A1 | 11/2021 | Yen | |
| 2021/0374632 A1 | 12/2021 | Cote et al. | |

FOREIGN PATENT DOCUMENTS

| | | |
|---|---|---|
| CN | 104680226 | 6/2015 |
| CN | 106485508 | 3/2017 |
| CN | 110462652 | 11/2019 |
| FR | 2859555 | 12/2005 |
| JP | 2000-094865 | 4/2000 |
| JP | 2001-518414 | 10/2001 |
| JP | 2003-534753 | 11/2003 |
| JP | 2004-342096 | 12/2004 |
| JP | 2006-40190 | 2/2006 |
| JP | 2008-532877 | 8/2008 |
| JP | 2008-541260 | 11/2008 |
| JP | 2009-075751 | 4/2009 |
| JP | 2009-116525 | 5/2009 |
| JP | 2010-535365 | 11/2010 |
| JP | 2011-509217 | 3/2011 |
| JP | 2012-040834 | 3/2012 |
| JP | 2014-511993 | 5/2014 |
| JP | 2015-232853 | 12/2015 |
| JP | 2017-016615 | 1/2017 |
| JP | 2019-200647 | 11/2019 |
| WO | 2005/055155 | 6/2005 |
| WO | 2006/094030 | 9/2006 |

(56)                    References Cited

FOREIGN PATENT DOCUMENTS

| WO | 2008/137806 | 11/2008 |
|----|-------------|---------|
| WO | 2009/085621 | 7/2009 |
| WO | 2011/005257 | 1/2011 |
| WO | 2012/126008 | 9/2012 |
| WO | 2014/113865 | 7/2014 |
| WO | 2015/151182 | 10/2015 |
| WO | 2018/125977 | 7/2018 |
| WO | 2019/014284 | 1/2019 |
| WO | 2019/204694 | 10/2019 |
| WO | 2019/204698 | 10/2019 |
| WO | 2019/204704 | 10/2019 |
| WO | 2020/006202 | 1/2020 |
| WO | 2020/006219 | 1/2020 |
| WO | 2021/134066 | 7/2021 |
| WO | 2021/138237 | 7/2021 |
| WO | 2021/247628 | 2/2022 |

OTHER PUBLICATIONS

"Spring '22 release notes," Mar. 23, 2022, posted at rfid.averydennison. com, site visited Sep. 15, 2023. https://rfid.averydennison.com/en/ home/products-solutions/lot/spring-22-release-notes.html, 2022.

Schindel, Alon, "Detect and prioritize CISA known exploited vulnerabilities in the cloud with Wiz," Feb. 10, 2022, posted at wiz.io, site visted Sep. 15, 2023. https://www.wiz.io/blog/detect-and-prioritize-cisa-known-exploited-vulnerabilites-kev-with-wiz, 2022.

Fanchi, Christopher, "Fully Customizable CRM System App Blueprint," Dec. 13, 2021, posted at backendless.com, site visited Sep. 18, 2023. https://backendless.com/crm-system-app-blueprint, 2021.

"3D graphs, diagrams, charts, world map," Jan. 19, 2021, posted at alamy.com, site visted Sep. 13, 2023. https://www.alamy.com/3d-graphics-diagrams-charts-world-map-infographic-elements-image415100174.htlm, 2021.

International Preliminary Report on Patentability dated Jul. 28, 2022 issued in corresponding IA No. PCT/US2021/015176 filed Jan. 27, 2021.

International Search Report and Written Opinion dated Jun. 22, 2023 issued in corresponding IA No. PCT/US2023/064597 filed Mar. 16, 2023.

International Search Report and Written Opinion dated Apr. 29, 2021 issued in corresponding IA No. PCT/US2021/015176 filed Jan. 27, 2021.

Ashlesh Sharma et al., "PaperSpeckle: Microscopic Fingerprinting of Paper," Computer and Communications Security, CCS'11, Oct. 17-21, 2011, Chicago, Illinois, USA, pp. 99-109.

International Search Report and Written Opinion dated Oct. 17, 2019 issued in corresponding IA No. PCT/US2019/044021 filed Jul. 30, 2019.

International Preliminary Report on Patentability dated Feb. 11, 2021 issued in corresponding IA No. PCT/US2019/044021 filed Jul. 30, 2019.

Third Party Observation filed Nov. 24, 2020 in corresponding IA No. PCT/US2019/044021 filed Jul. 30, 2019.

International Search Report and Written Opinion dated Nov. 25, 2020 issued in corresponding IA No. PCT/US2020/052257 filed Sep. 23, 2020.

International Preliminary Report on Patentability dated Apr. 7, 2022 issued in corresponding IA No. PCT/US2020/052257 filed Sep. 23, 2020.

International Preliminary Report on Patentability dated Jun. 22, 2023 dated Sep. 10, 2024 issued in corresponding IA No. PCT/US2023/064597 filed Mar. 16, 2023.

Zhu et al., "Print signatures for document authentication," Proceedings of the 10th ACM Conference on Computer and Communications Security, 2003.

Ashlesh Sharma et al., "The Fake vs Real Goods Problem: Microscopy and Machine Learning to the Rescue," KDD 2017 Applied Data Science Paper, pp. 2011-2019.

E-Commerce UI Kit—Josetc, https://web.archive.org/web/20180823185941/https://josetc.com/portfolio/e-commerce-ui-kit.

PORTFOLIO—Zhang, https://mengruzhang.com/pages/pinpinman.html.

Modaestile—Behance, https://www.behance.net/gallery/105919807/Modaestile.

\* cited by examiner

METHODS FOR AUTHENTICATING AN ITEM

CROSS-REFERENCE TO RELATED APPLICATION

The present application is a 371 of International Application No. PCT/US2021/015176, which was published in English on Aug. 5, 2021, and claims the benefit of U.S. Provisional Patent Application No. 62/966,147 filed Jan. 27, 2020, both of which is incorporated herein by reference in their entireties.

FIELD

Systems and methods for using entropically configured distinct physical features (an "identropy" or "identropies") are described herein. The systems and methods can include compression and encryption techniques to enable authentication without the use of online connectivity.

BACKGROUND

Counterfeiting involves the manufacturing and/or distribution of goods under someone else's name or another company's brand without their permission. Counterfeit goods (e.g., "fakes" or "knock offs") are generally made from lower quality components in order to sell a less expensive imitation of goods produced by brands that consumers know and trust. Counterfeit or pirated goods span multiple industries including luxury goods and apparel, jewelry, accessories, music, software, medications and medical devices, tobacco products, *cannabis* products, wine and spirits, consumer goods, toys, fresh produce, and electronics.

Counterfeiting is a significant issue, both in the developed and developing world. The Organization for Economic Cooperation and Development (OECD) and the European Union Intellectual Property Office (EUIPO) reported that trade in counterfeit and pirated goods amounted to 2.5%, or USD 461 billion, of international trade in 2013. The percentage in Europe alone was 5% of imported goods in 2013, which equates to USD 116 billion. In fiscal year 2013, the United States Department of Homeland Security (DHS) seized counterfeit good values at over $1.7 billion dollars at U.S. borders.

Counterfeit goods can put both sellers and consumers at risk. For example, counterfeit goods are often made using cheap, substandard, and/or dangerous components that can put the health and safety of consumers at risk. Purchasing goods from counterfeit websites can put consumers at risk for identity theft and financial fraud when consumers provide a counterfeit merchant with personal or financial information.

Many features are known that attempt to make it more difficult for the counterfeiter to "copy" an item. Unique and expensive packaging, holograms, hard-to-obtain materials all are known. However, these features can be mimicked or copied, often without matching the exact original feature. For the end-user, who needs to verify if an item equipped with such "authenticity"-feature is genuine, it is often difficult to recognize such features, as the end-user is not an expert who can recognize these special features.

Other authentication features that are known require an online connection through the internet, in order to find out if a specific security feature (e.g. a unique serial number, or image, or an entropically configured distinct physical feature) is genuine. Usage of the internet, however, is often slow, inconsistent, or in some cases is not possible. Furthermore, for mass-produced items such as food items, where large volumes of data may need to be processed, server capacity at the central verification end is limited.

It is therefore an objective of the present invention to provide a solution for the off-line authentication of a physical item, using ubiquitous and low-cost authentication devices, without the need of an on-line connection to a central database.

It is a further objective of the present invention to provide a solution for the off-line authentication of a wide range of physical items, by providing a method that offers both flexibility and security.

It is a further object of the invention to provide a means for an end user, such as a retailer or consumer, to verify the authenticity of an object, wherein the means involves or includes a trust quotient which provides a quantitative means for verifying the authenticity of the object.

SUMMARY

The methods and systems described herein include one or more entropically configured distinct physical features (an "identropy") that serve as unique identifiers for a physical item, such as a product or device, particularly products and/or devices in commerce, documents, packaging, etc. The identropy makes it possible to uniquely distinguish one item from the other. Due to the random nature of identropy features, the chances that two products carry the same entropically configured distinct physical features are infinitesimally small.

Identropies can be based on physical variations that occur naturally (e.g., randomly or entropically) during manufacturing or the article, such as the scatter or splatter pattern resulting from the printing of a label, text, and/or graphic on the article; the scatter or splatter pattern resulting from printing text and/or graphic on a tag or label attached to the article; unique, random patterns in paper fiber orientation within the label or tag; and/or unique topography of a surface of the article or label or tag on the article. For example, print defects that are intrinsic on the article itself or labels or tags attached to the article (such as inkjet drop splatter) provide a unique distribution of dot size, shape, and spacings, when imaged at appropriate resolution.

In one embodiment, after the application of the identropy to a surface of an item, the identropy needs to be converted into a digital entity. This is done through a challenge-response interaction, in which a physical challenge acts upon the identropy, and in which the identropy as a reaction to the challenge will provide a physical response. Other examples of a physical challenge-response pair include, but are not limited to, haptic feedback and RFID.

In some embodiments, the response(s) described above is encrypted. In some embodiments, the cryptographic system is a public-key cryptography, or asymmetric cryptography system, that uses pairs of keys: public keys which may be disseminated widely, and private keys which are known only to the owner. The generation of such keys depends on cryptographic algorithms based on mathematical problems to produce one-way functions. Effective security only requires keeping the private key private; the public key can be openly distributed without compromising security. In some embodiments, the encryption of the digital response or the digital converted analogue response is done using a private key. Corresponding to that particular private key, being used to encrypt the response from the identropy, is a particular public key. In some embodiments, a pair of private/public keys has a serial number. Each serial number corresponds to a unique pair of private/public keys. In some embodiment, the user who wants to use identropies to provide authentication has multiple private/public key pairs at his/her disposal. In some embodiments, each unique identropy comes with a unique pair of private and public keys. In other embodiments, the same private/public key pair may be used for multiple identropies.

In some embodiments, the encrypted signal may be compressed. Compression will reduce the amount of data that needs to be processed in a later stage, and will reduce the chances of brute force hacking the encrypted signal. In some embodiments, the encrypted and optionally compressed data is converted into a machine readable form, which can be printed on the item of which the identropy has been challenged.

In some embodiment, in the vicinity of the printer machine readable data, the sequence number that corresponds to the public private key pair that was used to encrypt the data can be printed. The serial number can be printed in human readable form or machine readable form. In some embodiments, the serial number is printed in machine readable format. In some embodiments, the machine readable encrypted data and the machine readable not-encrypted sequence number are printed in one machine readable format. In some embodiments, the encrypted response linked to the individual item is stored with the sequence number in a cloud-based, shared, immutable ledger for associating each of the individual physical items.

In some embodiments, the position at which the identropy needs to be challenged and/or at which the response to the challenge can be collected can be derived from the position of the machine readable code. If the position at which the identropy needs to be challenged and/or at which the response to the challenge can be collected cannot be derived from the position of the machine readable code, the position at which the identropy needs to be challenged and/or at which the response to the challenge can be collected needs to be indicated in another manner.

In some embodiments, the resulting decrypted and optionally decompressed code can be compared to the digital response that was retrieved upon the challenge by the authentication device. Ideally, these should be the same, as the identropy is the same. However, it may be that due to damages in transportation, random permutations occurring during the lifetime of the identropy or any other reason, the response of the authentication device is not exactly the same as the response retrieved by decrypting the printed machine readable code. In that case, it is possible to estimate a trust score, such as a trust quotient. Trust scores or trust quotients can be calculated using known techniques and changed or modified as needed to account for the variables in a specific system in order to calculate a trust quotient.

In some embodiments, the trust quotient provides the individual (e.g., retailer, consumer, etc.) with a degree or level of certainty (e.g., confidence level) that the article on hand is authentic. In some embodiments, the trust quotient is at least 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.95%, 99.99% or higher.

In the methods described herein, there is no need to verify the authenticity of the item while being connected to a central database. However, it may be useful for several purposes to have the authentication device connect to a central database. This may be needed for requesting new public keys with their corresponding sequence numbers, or for adding new transactions and new progress to the cloud-based, shared, immutable ledger.

The systems and methods described herein can be used to authentic/track a variety of articles including, but not limited to, goods in commerce and documents. Examples of articles include, but are not limited to, clothing (e.g., authentic sports jerseys, luxury clothing, etc.), shoes, accessories (e.g., hand bags, etc.), jewelry, wine and spirits, tobacco and *cannabis* products, pharmaceutical products and medical devices, cosmetics, food (e.g., fruits and vegetables, meats, seafood, dairy products, etc.), etc. Examples of documents include documents related to complex financial transactions, including letters of credit, guarantees, banker and buyer acceptance certificates, and inspection certificates, access credentials, passports, visas, drivers licenses, wills, deeds, bonds, stock certificates, and other similar articles.

In some embodiments, the systems and methods can be used to reduce, minimize or prevent the use of authentic packaging to package counterfeit goods. For example, measures which provide tamper evidence can be used to show that a package has been tampered with and therefore the article within may be counterfeit. Moreover, the packaging may contain one or more unique identifiers that associate the packaging with an authentic article therein.

The method also includes steps of inspecting the history and identity of the item by using private and/or public key tokens through a hashed chain of associated data.

DETAILED DESCRIPTION

I. Definitions

"Block chain" as used herein means a growing list of records, called blocks, that are linked using cryptography. Each block contains a cryptographic hash of the previous block, a timestamp, and transaction data. By design, a block chain is resistant to modification of the data.

"Database" as used herein means an organized collection of data, generally stored and accessed electronically from a computer system. The database can be hosted locally (e.g., on a machine or server) or can be cloud-based.

"Digital Twin" as used herein means a digital or virtual copy of a physical article or articles (e.g., products, documents, packaging, etc.).

"Distributed ledger" as used herein means a consensus of replicated, shared, and synchronized digital data geographically spread across multiple sites, countries, or institutions. There is no central administrator or centralized data storage.

"IDENTROPY" as used herein means a entropically configured distinct physical feature that serves as a unique identifier for a physical item.

"Scatter pattern" or "Splatter Pattern" as used herein means the random pattern resulting from the spatter of one or more materials, such as inks, dyes, pigments, adhesives, etc. during application to an article or a tag or label applied to the article.

"Trust quotient" as used herein refers to the confidence level that an article is authentic.

II. Systems and Methods for Authenticating an Item

A. Identropy

The systems and methods described herein include one or more IDENTROPYs as a means for authenticating and tracking articles, such as goods in commerce, documents, authentic brand packaging, etc. In some embodiments, the IDENTROPY is a random pattern that is generated during manufacture of the article. In some embodiments, the random pattern is the splatter or scatter pattern of ink and/or another material (e.g., dyes, pigments, adhesives, etc.) that is applied to the article during manufacture, or is applied to a tag or label that is attached to the article, and which can be read or imaged (e.g., optically). In other embodiments, the random pattern is an absorbance pattern. In some embodiments, one or more additives can be incorporated into the material which emit electromagnetic radiation in part of the spectrum outside the visible range (UV, IR, etc.). In some embodiments, the additives cause the pattern to luminesce or phosphoresce. Examples of such applications include printing the brand, size, material from which the article is made, texts or graphics that are applied to the article (logos, images, etc.), or combinations thereof. In other embodiments, the patterns described above are generated when a tag or label which is affixed to the article is prepared. The materials that can be used to generate the pattern are the same as above, namely inks, dyes, pigments, adhesive, etc.

A variety of conventional inks can be used. For example, conventional inks useful for inkjet applications can be used. Such inks include, but are not limited to, dye-based or pigment-based inks. Dye-based inks typically refer to dyes dissolved in a carrier, such as an aqueous carrier while pigment-based inks typically refer to pigment particles suspended in a carrier. In place of, or in addition to, conventional inkjet inks, thermochromic and/or photochromic inks can be used. Thermochromic ink is a type of ink that changes color with the application (or removal of heat). For reversible thermochromic inks, the color will revert when the temperature returns to its original level. For irreversible thermochromic inks, the color remains constant after a change in temperature. Photochromic ink is a type of ink that change color when the intensity of incoming light changes. For example, the ink can change from colorless to colored upon exposure to UV light and then fade back to colorless when the light source is removed. Such inks can be used in combination with other security features as described above, such as QR codes. Combinations of QR codes with functional inks are described in Gloric et al., Sensors, 19, 586 (2019).

Other IDENTROPYs include topography of the article, document, or tag or label substrate or topography of a material applied to the article, document, or tag or label, such as inks, dyes, pigments, and/or adhesives. For example, the random pattern of a discontinuous layer of an adhesive can be a unique identifying feature.

B. Physical Challenge-Response Pair

After the application of the identropy to one or more surfaces of the item, the identropy needs to be converted into a digital entity. This is done through a challenge-response interaction, in which a physical challenge acts upon the identropy, and in which the identropy as a reaction to the challenge provides a physical response. A typical exemplary embodiment of such physical challenge-response pairs is imaging the identropy. In some embodiments, the identropy can be imaged visually, e.g. by taking a photograph, in which the challenge is the light that falls on the identropy, and the response is the light that is sent back from the identropy into the camera. The light that is sent back from the identropy to the camera may be modified in many ways by the features of the identropy, such as the frequency, frequency distribution, intensity, polarization plane, or other properties.

In other embodiments, the IDENTROPY contains one or more additives which emit electromagnetic radiation in one or more part of the electromagnetic spectrum, for example, other than the visible portion of the spectrum. For example, in some embodiments, the one or more additives can be excited using an excitation source and the resulting emission of radiation (e.g., luminescence or phosphorescence) can be imaged using an appropriate device, such as a fluorescence microscope.

In some embodiments, the physical challenge-response pair is haptic feedback, in which the challenge is a sensor that touches the identropy, and the challenge is the force that the force sensor receives under the influence of the height or the elasticity of the identropy.

In other embodiments, the physical challenge-response pair is an RFID (radio-frequency identification) in which the challenge is the emission of electromagnetic radio waves by a RFID scanning device such as a NFC-enabled smartphone or an RFID-reader, and the response is the emission of modified electromagnetic radio waves by the identropy containing an RFID.

In some embodiments, the response is an analog signal that is converted into a digital signal. Typical examples of such conversions are charge-coupled devices (CCD) or active-pixel sensors (CMOS sensors). In other embodiments, the response signal is a digital signal. In the case of an RFID challenge-response pair, the returning signal carries digitized information, and as such does not need to be converted into a digital signal.

Whatever the method of imaging, it should be efficient and easy to use. For example, in some embodiments, the IDENTROPY imaged using a handheld device fitted with an appropriate lens (e.g., macro lens), microscope, detector, reader, etc. in order to image or read the IDENTROPY. Suitable handheld devices include, but are not limited, smart phones, tablets, application-specific device (e.g., designed and manufactured specifically to image the IDENTROPY). In other embodiments, the IDENTROPY can be imaged using a device or piece of equipment installed in a particular location, such as warehouse, shipping container, transportation vehicle (train, boat, truck, etc.,), retail location, etc. Such devices or equipment can be set up to image a large number of articles, e.g., designed to image the IDENTROPY of articles moving along a conveyor belt.

In addition to ease of use, the method for imaging or reading the IDENTROPY should also be rapid. The IDENTROPY should be imaged or read and stored in a matter of seconds or less in order for the systems and methods described herein to be efficient and economically feasible. In some embodiments, the time required to image or read the IDENTROPY is less than 5, 4, 3, 2, 1, 0.75, 0.5, 0.25. 0.1, 0.05, 0.025, 0.01, 0.005, 0.0025, 0.001 seconds or less. In some embodiments, the time required to image or read the IDENTROPY and store the image is less than 5, 4, 3, 2, 1, 0.75, 0.5, 0.25. 0.1, 0.05, 0.025, 0.01, 0.005, 0.0025, 0.001 seconds or less.

C. Encryption

In some embodiments, the identropy and challenge-response are as described above and the digital response or the digital converted analogue response is encrypted. Encryption is the process of encoding a message or information in such a way that only authorized parties can access it and those who are not authorized cannot. Encryption is an essential feature in authentication, as it will allow the authenticator to place trust in the authentication system.

Public-key cryptography, or asymmetric cryptography, is a cryptographic system that uses pairs of keys: public keys which may be disseminated widely, and private keys which are known only to the owner. The generation of such keys depends on cryptographic algorithms based on mathematical problems to produce one-way functions. Effective security only requires keeping the private key private; the public key can be openly distributed without compromising security.

In some embodiments, the encryption of the digital response or the digital converted analogue response is done using a private key. Corresponding to that particular private key, being used to encrypt the response from the identropy, is a particular public key. In some embodiments, a pair of private/public keys has a serial number. Each serial number corresponds to a unique pair of private/public keys.

In some embodiment, the user who wants to use identropies to provide authentication has multiple private/public key pairs at his/her disposal. In some embodiments, each unique identropy comes with a unique pair of private and public keys. In other embodiments, the same private/public key pair may be used for multiple identropies.

Typical exemplary embodiments of encryption protocols suitable for the systems and methods described herein include, but are not limited to, Diffie-Hellman key exchange protocol, DSS (Digital Signature Standard), which incorporates the Digital Signature Algorithm, ElGamal, various elliptic curve techniques, various password-authenticated key agreement techniques, the Paillier cryptosystem, RSA encryption algorithms (PKCS #1), a Cramer-Shoup cryptosystem, the YAK authenticated key agreement protocol, the NTRUEncrypt cryptosystem, McEliece cryptosystem, and quantum-safe cryptography.

In some embodiments, the encrypted signal may be compressed. Compression will reduce the amount of data that needs to be processed in a later stage, and will reduce the chances of brute force hacking the encrypted signal. In some embodiments, the encrypted and optionally compressed data is converted into a machine readable form, which can be printed on the item of which the identropy has been challenged. Typical exemplary embodiments are plain text, linear barcodes, QR-codes, SnapTags, DataMatrix codes, Digimarc codes, EzCodes and the like.

In some embodiment, in the vicinity of the printer machine readable data, the sequence number that corresponds to the public private key pair that was used to encrypt the data can be printed. The serial number is not encrypted, but is represented as is. The serial number can be printed in human readable form or machine readable form. In some embodiments, the serial number is printed in machine readable format. Typical exemplary embodiments of this machine readable format are plain text, linear barcodes, QR-codes, SnapTags, DataMatrix codes, Digimarc codes, EzCodes and the like.

In some embodiments, the machine readable encrypted data and the machine readable not-encrypted sequence number are printed in one machine readable format. In some embodiments, the encrypted response linked to the individual item is stored with the sequence number in a cloud-based, shared, immutable ledger for associating each of the individual physical items. Examples of such ledgers include, but are not limited to, a block chain and *Hedera* Hashgraph.

In some embodiments, the position at which the identropy needs to be challenged and/or at which the response to the challenge can be collected can be derived from the position of the machine readable code. If the position at which the identropy needs to be challenged and/or at which the response to the challenge can be collected cannot be derived from the position of the machine readable code, the position at which the identropy needs to be challenged and/or at which the response to the challenge can be collected needs to be indicated in another manner.

The result of the process described so far is an item, on which an identropy is available, and a machine readable code in which the encrypted response is stored together with, or in the vicinity of, a machine readable form that represents the unencrypted sequence number that corresponds to the private key with which the encryption was done.

D. Authentication

Following imaging/reading and storage of the response, authentication may be done. This can be done, for example, (1) somewhere in the transportation chain, to verify that the item being transported is genuine; (2) at a point-of-sale, to show a potential customer that the item for sale is genuine; (3) by the individual who has acquired the item, to validate the authenticity of the item; or (4) in any situation where someone will want to demonstrate or validate the authenticity of the item.

For the authentication step, an authentication device is required that is able to perform a challenge-response action upon the identropy in a similar way as was done earlier before the encryption step. In some embodiments, the challenge uses the same physical phenomenon as means to elicit a response from the identropy. However, other physical challenges, with different physical characteristics, submitted to the identropy, may provide equivalent responses. For example, the wavelength of the light that was used to create the initial response prior to encryption can be different from the wavelength that is used in the authentication phase.

In some embodiments, the authentication is performed with a mobile device, such as a smartphone, a tablet computer, a laptop, and RFID reader device and the like. The device that sends out the challenge can be a different device from that which collects the response of the identropy to said challenge, or both these devices can be combined. The device for the computational part of the authentication process, such as compression, decryption, calculation of a trust score and the like can be a separate device from the devices for the challenge-response reaction, or they can be combined. In some embodiments, all devices used in the authentication process are combined into one device.

In some embodiments, the authentication device interacts with the identropy through a challenge-response interaction. When the challenge is sent to the entropy, the response is collected by the authentication device. If needed, the response is converted to a digital form. If the response is already in a digital form, no conversion is needed. In other embodiments, the authentication device also scans the machine readable code that is present in the vicinity of the identropy. The authentication device then extracts the sequence number and the encrypted and optionally compressed data from the machine readable code.

In some embodiments, the authentication device contains a database with one or more public keys, each public key corresponds to the sequence number that has been assigned to the public/private key pair prior to the encryption step. When the authentication device has read the sequence number, the encrypted data can be decrypted using the public key corresponding to the sequence number. When needed, the decrypted data can be decompressed at this point.

In some embodiments, the resulting decrypted and optionally decompressed code can be compared to the digital response that was retrieved upon the challenge by the authentication device. Ideally, these should be the same, as the identropy is the same. However, it may be that due to damages in transportation, random permutations occurring during the lifetime of the identropy or any other reason, the response of the authentication device is not exactly the same as the response retrieved by decrypting the printed machine readable code. In that case, it is possible to estimate a trust score, such as a trust quotient.

In some embodiments, the trust quotient (TQ) can be calculated using the following equation:

TQ=Function[(F_intrinsic),(F_extrinsic),(F_geo-temporal trace of its digital twin),(F_tamper trace)] divided by the [System Noise]

Where,

F_intrinsic refers to entropic signature intrinsic to a material e.g. the intricate surface topography, paper fiber orientation, etc.;

F_extrinsic refers to primary or secondary additions derived from handling e.g. inkjet drop splatter, addition of unique tracers (Tukan/DUST), etc.; and F_geo-temporal refers to the ability to leverage the tethered digital information that is derived from the location (geo) and temporal (time) or even integrated social media sources arising from recording these digital information signature tracks to validate/repudiate a given item level serial.

The exemplary equation above provides a mathematical means to measure the kurtosis from order parameters derived from spatial complexity on the physical entity (in statistical mechanics referred to as "configuration entropy") to provide the end user with a means of quantifying the confidence level with respect to the authenticity of the article. One of ordinary skill in the art will recognize that the equation above can be changed or modified as needed to account for the variables in a specific system in order to calculate a trust quotient.

In some embodiments, the trust quotient provides the individual (e.g., retailer, consumer, etc.) with a degree or level of certainty (e.g., confidence level) that the article on hand is authentic. In some embodiments, the trust quotient is at least 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.95%, 99.99% or higher.

The trust quotient (TQ) reflect the aggregate measure of voracity that helps the end user "connect the dots" as an article proceeds through its life cycle (manufacture, supply chain, sale, and use). One example of this is the concept of digital twins. A digital twin is a digital or virtual copy of a physical article or articles (e.g., products, documents, packaging, etc.). Digital twins connect the real and virtual world by collecting real-time data from sensors or security features.

In the methods described herein, there is no need to verify the authenticity of the item while being connected to a central database. However, it may be useful for several purposes to have the authentication device connect to a central database. This may be needed for requesting new public keys with their corresponding sequence numbers, or for adding new transactions and new progress to the cloud-based, shared, immutable ledger.

E. Articles to be Authenticated

The systems and methods described herein can be used to authentic/track a variety of articles including, but not limited to, goods in commerce and documents. Examples of articles include, but are not limited to, clothing (e.g., authentic sports jerseys, luxury clothing, etc.), shoes, accessories (e.g., hand bags, etc.), wine and spirits, tobacco and *cannabis* products, pharmaceutical products and medical devices, cosmetics, medical device, fruits and vegetables, etc.

Examples of documents include documents related to complex financial transactions, including letters of credit, guarantees, banker and buyer acceptance certificates, and inspection certificates, access credentials, passports, visas, drivers licenses, wills, deeds, bonds, stock certificates, and other similar articles.

In some embodiments, the systems and methods can be used to reduce, minimize or prevent the use of authentic packaging to package counterfeit goods. For example, measures which provide tamper evidence can be used to show that a package has been tampered with and therefore the article within may be counterfeit. Moreover, the packaging may contain one or more unique identifiers that associate the packaging with an authentic article therein.

The method also includes steps of inspecting the history and identity of the item by using private and/or public key tokens through a hashed chain of associated data.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method for authenticating an item, said method comprising the steps of:

a. receiving, an item by an authentication system, wherein the item includes an entropically configured distinct physical feature ("identropy") on the surface of the item, and wherein the identropy is an encrypted first converted digital response printed in a machine-readable code;

b. accessing, by the authentication system, a plurality of sets of different encryption key pairs based on a first challenging of the identropy, each set of the plurality of sets of different encryption key pairs comprising a private encryption key and a sequence number, wherein each sequence number in the plurality of sets is different from the other sequence numbers in the plurality of sets;

c. selecting, by the authentication system, a first sequence number out of the sequence numbers provided in the plurality of sets of different encryption key pairs, wherein the selected first sequence number is printed in the adjacency of, or in the same area as, the machine-readable code;

d. accessing, by the authentication system, a plurality of sets of decryption keys based on the selected first sequence number, wherein each set of the plurality of sets of decryption keys comprises a public decryption key and a sequence number;

e. executing a second challenging of the identropy, by the authentication system, and retrieving a second converted digital response based on the second challenging;

f. scanning, by the authentication system, the machine-readable code;

g. scanning, by the authentication system, the selected first sequence number that is provided on, or in, the item;

h. selecting, by the authentication system, the public decryption key corresponding to the selected first sequence number;

i. decrypting, by the authentication system, the machine-readable code using the public decryption key corresponding to the selected first sequence number yielding a second converted digital response;

j. comparing, by the authentication system, the second converted digital response and the first converted digital response; and k. calculating, by the authentication system, a trust quotient based on the comparison between the second converted digital response and the first converted digital response and further based at least on an entropic signature intrinsic to a material of the item, an addition derived from handling of the item, tethered digital information derived from location and temporal data associated with a digital twin, and whether tamper evidence traces exist;

wherein the trust quotient quantifies a level of confidence in the item's authenticity; and wherein the digital twin is a digital or virtual copy of the item, and wherein the digital twin has real-time data collected from sensors or security features.

2. The method of claim 1, wherein the plurality of sets of decryption keys in step (d) are stored in software on a mobile device.

3. The method of claim 2, wherein the step (e) is performed using the software on the mobile device.

4. The method of claim 3, wherein step (f) is performed using the software on the mobile device.

5. The method of claim 4, wherein step (g) is performed using the software on the mobile device.

6. The method of claim 1, in which the position of the identropy on the item is derived from the position of the machine-readable code on the item.

7. The method of claim 1, where the first converted digital response is compressed prior to the encrypting and where the second converted digital response is decompressed after decrypting the machine-readable code.

8. The method of claim 1, wherein the identropy is a scatter or splatter pattern.

9. The method of claim 8, wherein the identropy is imaged optically.

10. The method of claim 2, wherein the mobile device is selected from a group consisting of a smart phone, a tablet, or other handheld device.

11. The method of claim 1, in which the item is a package containing a good selected from a group consisting of luxury goods and apparel, accessories, music, software, medications and medical devices, tobacco products, cannabis products, wine and spirits, consumer goods, toys, fresh produce, and electronics.

12. The method of claim 1, wherein the second challenging is executed at one or more location selected from a group consisting of a warehouse, a plane, a train, a truck, a shipping container, a retail location, or a location of a customer/consumer.

* * * * *